(12) United States Patent
Keers et al.

(10) Patent No.: US 8,094,513 B2
(45) Date of Patent: Jan. 10, 2012

(54) DETERMINING POSITIONING OF SURVEY EQUIPMENT USING A MODEL

(75) Inventors: Henk Keers, Oslo (NO); Suriyakan Vongtragool, Lampang (TH); Kenneth E. Welker, Nesoya (NO); Svein Arne Frivik, Oslo (NO); Halvor Groenaas, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 411 days.

(21) Appl. No.: 12/132,558

(22) Filed: Jun. 3, 2008

(65) Prior Publication Data

US 2009/0296519 A1    Dec. 3, 2009

(51) Int. Cl.
*G01V 1/38* (2006.01)
(52) U.S. Cl. ........................................................ 367/19
(58) Field of Classification Search .................... 367/15, 367/16, 19, 21, 106, 130
See application file for complete search history.

(56) References Cited

U.S. PATENT DOCUMENTS

| | | | |
|---|---|---|---|
| 4,068,208 A * | 1/1978 | Rice et al. | ........................ 367/19 |
| 5,757,722 A | 5/1998 | Zinn | |
| 6,088,294 A | 7/2000 | Leggett, III et al. | |
| 6,244,375 B1 | 6/2001 | Norris et al. | |
| 7,376,045 B2 * | 5/2008 | Falkenberg et al. | ............. 367/19 |
| 7,417,924 B2 * | 8/2008 | Vigen et al. | .................... 367/129 |

OTHER PUBLICATIONS

Keers, et al., Acoustic Crosswell Imaging Using Asymptotic Waveforms, Geophysics, 2000, pp. 1569-1582, vol. 65.
Keers, et al., Viscoacoustic Crosswell Imaging Using Asymptotic Waveforms, Geophysics, 2001, pp. 861-870, vol. 66.
PCT Search Report, dated Dec. 28, 2009, Application No. PCT/US2009/045254.

* cited by examiner

*Primary Examiner* — Ian Lobo
(74) *Attorney, Agent, or Firm* — Dan C. Hu; Kevin P. McEnaney; Kevin B. McGoff

(57) ABSTRACT

To performing positioning of survey equipment, measurements of acoustic signals reflected from at least one boundary of a marine environment are received. The reflected acoustic signals are reflected from the at least one boundary in response to acoustic signaling originated by an acoustic source. A positioning model is updated based on the measurements of the acoustic signals, wherein the positioning model contains information relating to positions of components of a positioning system that includes the acoustic source and acoustic receiver.

22 Claims, 5 Drawing Sheets

US 8,094,513 B2

DETERMINING POSITIONING OF SURVEY EQUIPMENT USING A MODEL

TECHNICAL FIELD

The invention relates generally to determining positioning of survey equipment using a model.

BACKGROUND

Seismic surveying is used for identifying subterranean elements, such as hydrocarbon reservoirs, fresh water aquifers, gas injection reservoirs, and so forth. In performing seismic surveying, seismic sources are placed at various locations above an earth surface or sea floor, with the seismic sources activated to generate seismic waves directed into the subterranean structure. Examples of seismic sources include explosives, air guns, or other sources that generate seismic waves. In a marine seismic surveying operation, the seismic sources can be towed through water.

The seismic waves generated by a seismic source travel into the subterranean structure, with a portion of the seismic waves reflected back to the surface for receipt by seismic receivers (e.g., geophones, hydrophones, etc.). These seismic receivers produce signals that represent detected seismic waves. Signals from seismic receivers are processed to yield information about the content and characteristic of the subterranean structure.

It is often useful to know the positions of seismic receivers (and other components of survey equipment). Typically, in marine acquisition, the positions of the seismic receivers are determined using a high-frequency acoustic network. High-frequency sources in this network can emit signals that are recorded by the acoustic receivers. Note that such high-frequency sources used for positioning differ from seismic sources in that seismic sources usually operate in a lower frequency range. Note also that the acoustic receivers of the acoustic network can be the same as (or can be a subset of) the seismic receivers.

However, many conventional acoustic positioning techniques suffer from inaccuracies.

SUMMARY

In general, according to an embodiment, to determine positioning of survey equipment, acoustic signals originated by acoustic source(s) and reflected from at least one boundary (e.g., water surface and/or bottom surface in a marine environment) are considered. The acoustic signals reflected from the at least one boundary are used to update a model that can be used to determine positioning of components of a survey system.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
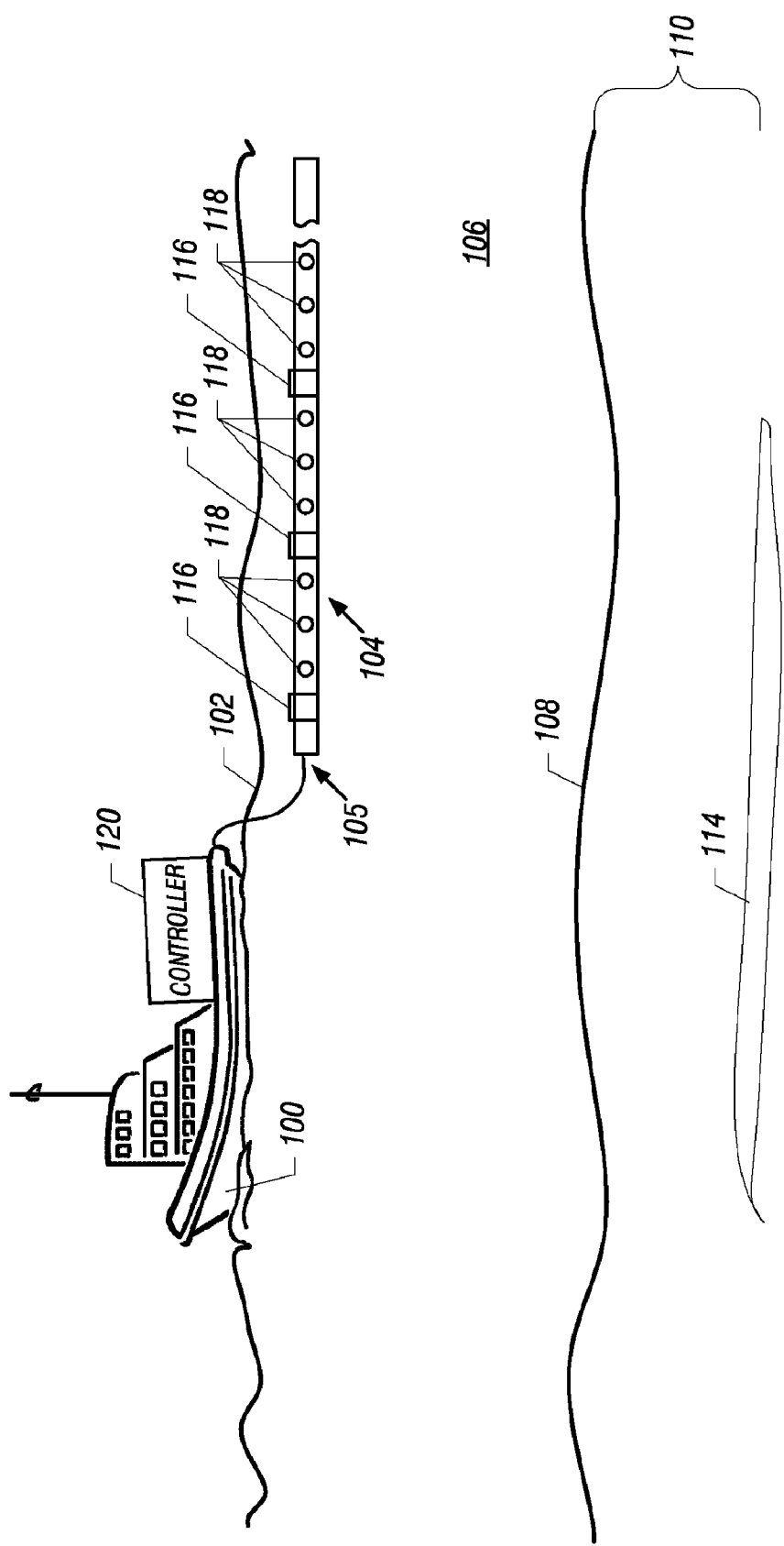
FIG. 1 illustrates an example marine survey arrangement that includes an acoustic positioning system, according to some embodiments.

FIG. 1 illustrates an example marine survey arrangement that includes a marine vessel 100 for towing a survey spread 104 in a body of water 106 between a water surface 102 and a bottom surface 108 (e.g., sea floor). The survey spread 104 includes at least one streamer 105, as depicted in FIG. 1. Note, that typically a survey spread can include multiple streamers.

The survey spread 104 can have survey sources and survey receivers, where the survey sources are able to emit signals propagated through the body of water 106 and into a subterranean structure 110. Signals are reflected from one or more bodies of interest 114 in the subterranean structure 110, with the reflected signals received by survey receivers in the survey spread 104.

In some embodiments, the survey spread 104 includes seismic acoustic sources (not shown) and seismic acoustic receivers. Examples of seismic sources include air guns, vibrators, explosives, and so forth. Examples of seismic receivers include geophones, hydrophones, and so forth.

In addition to the seismic sources and receivers, each streamer 105 can also includes acoustic positioning equipment, including, as examples, positioning acoustic sources 116 and positioning acoustic receivers 118. The positioning acoustic receivers 118 can be the same as the seismic receivers (or some subset of the seismic receivers). The positioning acoustic sources 116 can be higher frequency acoustic sources (which are distinguished from lower frequency seismic sources used for performing a seismic survey operation).

Note also that the acoustic positioning system can be separate from the streamer on which seismic equipment is deployed. Moreover, note that although reference is made to seismic surveying, similar positioning techniques can be applied for positioning other types of survey equipment, such as electromagnetic (EM) survey equipment that includes EM sources and EM receivers.

The marine vessel 100 also includes a controller 120, which can be implemented with a computer, for example. The controller 120 is able to control activation of the acoustic sources 116 of the acoustic positioning system. In addition, the controller 120 is able to receive observed data collected by acoustic receivers 118 responsive to acoustic signals generated by the acoustic sources. Travel times of acoustic signals can be derived from the observed data. The controller 120 can then process the observed travel times and other information to produce (or update) a positioning model to enable estimation of positioning of the survey equipment (e.g., depth of a streamer, distances between seismic receivers, and so forth).

In accordance with some embodiments, in producing (or updating) the positioning model, the controller 120 takes into account acoustic signals that are emitted by the acoustic sources 116 and reflected from the water surface 102 (an upper boundary) and sea floor 108 (a lower boundary). Thus, rather than just take into account direct (non-reflected) acoustic signals traveling from an acoustic source to an acoustic receiver, techniques according to some embodiments also take into account acoustic signals reflected from an upper boundary (e.g., water surface 102) and a lower boundary (e.g., sea floor 108). Considering the reflected signals in updating the positioning model allows for provision of a more accurate model. Note that reflected signals from just one boundary (either upper or lower boundary) could be considered, in conjunction with direct acoustic signals.

Moreover, techniques according to some embodiments do not have to use an assumption that velocity in the body of water 106 is constant throughout the body of water. In fact, the velocity of acoustic signals in the body of water can spatially vary (such as in different layers of the body of water) due to variations in salinity and/or temperature. Techniques according to some embodiments can take into account differences of velocities of acoustic signals in the body of water.

The waves emitted by an acoustic source approximately satisfy the Helmholtz equation:

$$\Delta u(x, \omega) + \frac{\omega^2}{c^2(x)} u(x, \omega) = \delta(x-s) w(t), \quad \text{(Eq. 1)}$$

where $w(t)$ is the wavelet emitted by the acoustic source, s is the source position, u is the pressure recorded at x (acoustic receiver position), $\omega$ is circular frequency, and c is acoustic velocity in water. An efficient way to solve Eq. 1 is by using asymptotic ray theory, which assumes that the acoustic energy propagates along ray paths. For this purpose, the following equation can be inserted into Eq. 1:

$$u(x,\omega) = A(x) e^{i\omega T(x)}, \quad \text{(Eq. 2)}$$

where $A(x)$ is the acoustic signal amplitude received at receiver x, and T represents travel time from the source to receiver. Up to highest order in frequency $\omega$, it is determined that:

$$|\nabla T(x)|^2 = c^2(x). \quad \text{(Eq. 3)}$$

Eq. 3, the eikonal equation, is an equation for the wave fronts T of the acoustic waves. The equation for the amplitudes of the acoustic waves, the transport equation, follows by putting together terms of the second highest order in $\omega$. The equations for the ray paths themselves follow by applying the method of characteristics to the eikonal equations. It is therefore determined that:

$$\frac{dx}{dt} = c^2(x) p$$
$$\frac{dp}{dt} = -\frac{1}{c(x)} \nabla c(x),$$

where $x(t)$ is the ray path and $p(t)$ the tangent vector to the ray path. The travel time T at x is given by the value of the independent parameter t. The initial conditions, $x(0)=s$ and $p(0)$ (the take-off direction), are given.

The ray equations can be solved using a variety of methods, such as Runge-Kutta or any other numerical solver for ordinary differential equations. In the case of acoustic positioning, the velocity is smoothly varying. Rays from the source to the receiver that are not reflected from the water surface or sea floor can be found easily using two point ray tracing. However, rays reflected from these boundaries are harder to find numerically. It is therefore useful to obtain good initial conditions for the two point ray tracing. These may be obtained from analytical expressions for the ray paths if the water velocity is constant.

Figure 2:
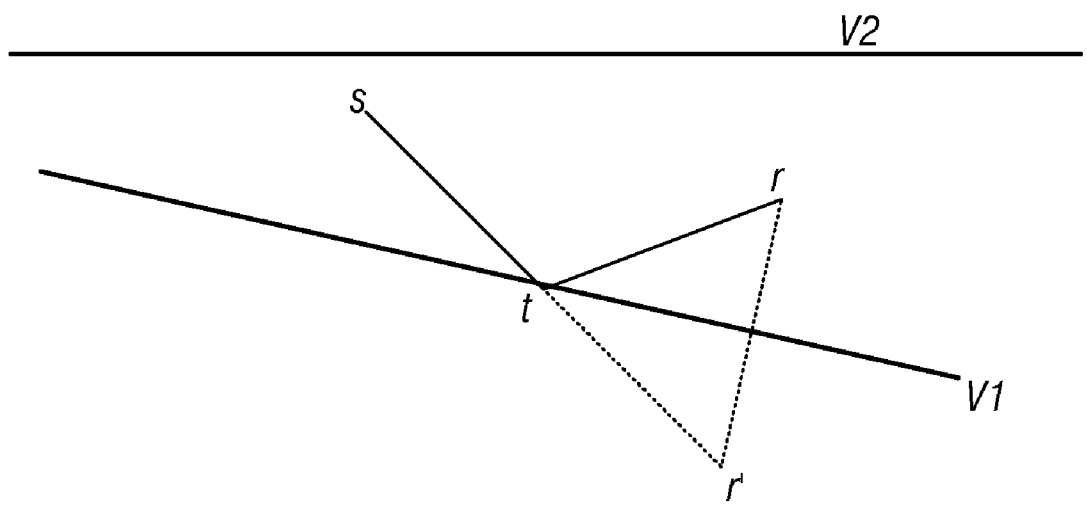
FIGS. 2 and 3 illustrate ray paths that are considered for producing a model that is to be used for performing positioning of survey equipment.

FIG. 2 shows an example arrangement including a source position s, receiver position r, a sea floor V1, and the water surface V2. The general situation of rays propagating in a medium between two flat boundaries (V1 and V2 in FIG. 2) with arbitrary orientation is considered. The equation for these boundaries are given by $(x,N_i)=a_i$.

Given a source position s and receiver position r on the same side of a boundary (e.g., sea floor V1), the reflection point t of the ray from s to r (as depicted in FIG. 2) is defined as:

$$t = s + \frac{a_i - (s, N_i)}{(r' - s, N_i)} (r' - s), \quad \text{(Eq. 4)}$$

where r' is the mirror point of r with respect to v1 (see FIG. 2). The mirror point r' is the point across the boundary V1 that is a mirror of r. The mirror point r' is defined by:

$$r' = r + 2(a - (r,N))N. \quad \text{(Eq. 5)}$$

For ray paths reflected from the water surface V2, similar reflection points t can be defined.

Figure 3:
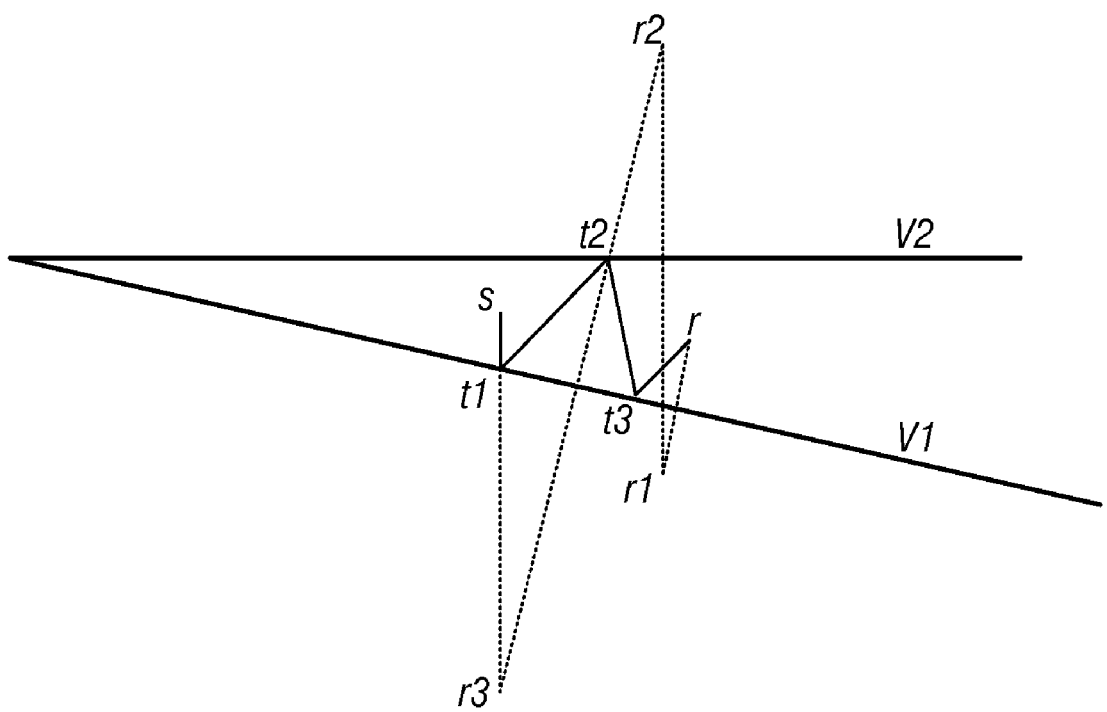

The travel time T and amplitude A now follow from the length of s-r'. Note that it is easier to compute the length of s-r' since s-r' is a straight line. These formulas can be extended to include any number of reflections. For example, in the case of three reflections (as depicted in FIG. 3), the following mirror points can be defined:

$$r_1 = r + 2(a_1 - (r_1, N_1))N_1$$

$$r_2 = r_1 + 2(a_2 - (r_1, N_2))N_2,$$

$$r_3 = r_2 + 2(a_1 - (r_2, N_1))N_1$$

where $r_1$ is the mirror point of r to V1, and similar definitions hold for mirror points $r_2$ and $r_3$. Note that $r_2$ is a mirror point across the water surface V2. Multiple reflections are depicted in FIG. 3, where the multiple reflections are between the sea floor V1 and water surface V2. Reflection points (or rays at boundary V1 or V2) are defined as $t_i$, where i=1, 2, ..., n (n being the number of reflections).

From geometric considerations, $t_1$ is the intersection of the line $sr_3$ with V1, $t_2$ is the intersection of the line $t_1 r_2$ with V2, and $t_3$ is the intersection of the line $t_2 r_1$ with V1. From these equations, one can determine the travel time and amplitude of the multiply reflected acoustic wave. The general case of n reflections can be solved in similar fashion.

Thus, in accordance with some embodiments, travel times of acoustic signals reflected once or multiple times from an upper boundary and from a lower boundary can be considered in producing (or updating) a positioning model for use in determining a position of survey equipment.

The above discussion has assumed a constant velocity in the body of water 106. However, that is usually not the case, as acoustic velocity in water can vary in different layers of the water, such as due to salinity or temperature variation.

If the velocity in the body of water is heterogeneous, e.g., $c=c_0+c_1$, then the ray paths and the corresponding travel times and amplitudes can change. The above assumes two different velocities $c_1$ and $c_2$; more generally, there can be additional different velocities. The above ray equations can be used in this case, but one of various types of perturbation theories for the travel times and ray paths can also be used, which are faster to process but may be less accurate. To first order, the correction in travel time $\delta T$ due to velocity variation in a body of water is found by integrating the heterogeneous velocity along the unperturbed ray:

$$\int_{s_0} \frac{c_1}{c_0^2} ds.$$

The second correction to apply would be to compute the perturbed ray paths. These can be found to first order by integration using the unperturbed ray paths.

Basically, if constant velocity is assumed, then a ray path from a source to a boundary or from a boundary to a receiver is straight. However, if velocity varies, then the ray path is curved (made up of various straight height segments in corresponding layers of constant velocity).

As noted above, the information computed above can be used to update a positioning model that includes positions of acoustic sources and receivers and a velocity profile. The velocity profile refers to velocity of acoustic signals in various layers of a body of water.

Given an initial positioning model, including source and receiver positions and a velocity profile, and observed data, the positioning model can be updated using an inversion technique. With the inversion technique, the following objective function $$\sum_{s,r,i} |T_{o,i}(r, s) - T_{c,i}(r, s, c)|^2$$

is minimized, where $T_{o,i}(r,s)$ is the observed travel time of ray type i from source s to receiver r, and $T_{c,i}(r,s,c)$ is the corresponding calculated travel time. Ray type i refers to one of several possible ray types: (1) direct ray from source to receiver; (2) ray reflected from lower boundary to receiver, and (3) ray reflected from upper boundary to receiver. This problem can be linearized as follows:

$$T_i^c(r + \delta r, s + \delta s, c + \delta c) = T_i^c(r, s, c) + \frac{\partial T}{\partial r}\delta r + \frac{\partial T}{\partial s}\delta s + \frac{\partial T}{\partial c}\delta c, \quad \text{(Eq. 6)}$$

where the various partial derivatives can be computed. This reduces the nonlinear minimization problem to a linear problem:

$$\min \sum_i |\delta T_i - (A\delta m)_i|^2, \quad \text{(Eq. 7)}$$

where i is an index that goes over all data (ray types and source-receiver combinations) and A is a matrix that contains the partial derivatives. This linear problem can be solved using any least squares solver. Particularly appropriate in this case is an algorithm such as LSQR, which is a sparse matrix solver (note that matrix A is large and sparse). Often the least squares problem is augmented using damping and smoothing factors to stabilize the inversion procedure. The damping factor ensures that solutions close to the starting model are favored, and the smoothing factor (which is especially appropriate for the part of the inversion that determines the velocity model) ensures that the inverted model is smooth. In this case the matrix equation to be inverted becomes:

$$\delta T = \begin{pmatrix} A \\ \lambda_1 I \\ \lambda_2 D \end{pmatrix} \delta m, \quad \text{(Eq. 8)}$$

where I is an identity matrix, $\lambda_1$ and $\lambda_1$ are smoothing parameters, D is a difference operator, and $\delta m$ is the change in the model that is to be computed. The vector $\delta m$ contains $\delta s$ (change in source position), $\delta r$ (change in receiver position), and $\delta c$ (change in velocity). Note that $\delta T$ is a vector containing $\delta T_i$ over all ray types i and source-receiver combinations.

If the covariance matrix for the data is known, then a covariance matrix for the positioning model can also be determined. This is particularly important if the absolute locations are determined using for example GPS receivers located at various places on the streamers. Finally, the geometrical amplitude and even the whole waveform can be used if necessary, to refine the inversion result, using a similar method as in H. Keers et al., "Acoustic Crosswell Imaging Using Asymptotic Waveforms," Geophysics, 65, pp. 1569-1582 (2000). Also the attenuative properties of the water can be determined using such method as shown by H. Keers et al., "Viscoacoustic Crosswell Imaging Using Asymptotic Waveforms," Geophysics, 66, pp. 861-870 (2003), in a different context.

Figure 4:
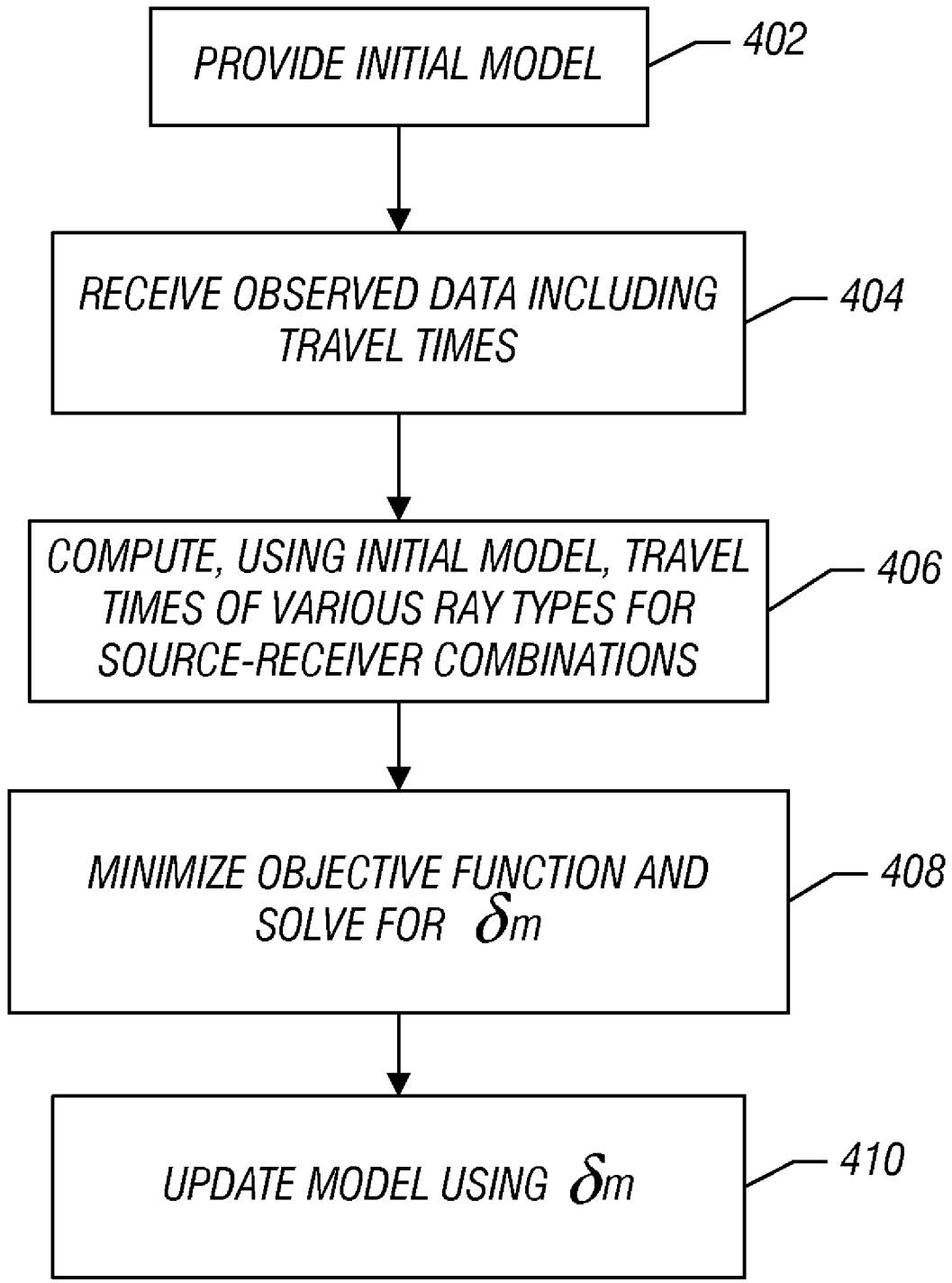
FIG. 4 is a flow diagram of a process of producing a model to be used for determining positioning of survey equipment, according to an embodiment.

FIG. 4 is a flow diagram of a process of producing a model that can be used for determining positions of components of survey equipment, according to some embodiments. An initial model is provided (at 402), where the initial model includes positions of acoustic sources and receivers in the acoustic positioning system. The initial model can also include a velocity profile, which specifies different velocities in different layers of a body of water in which the acoustic positioning system is placed.

Next, after deployment of the acoustic positioning system in a body of water, observed data including travel times, is received (at 404). The travel times refer to travel times associated with acoustic signals being received by acoustic receivers of the acoustic positioning system. The received acoustic signals include: (1) direct acoustic signals (from acoustic source to acoustic receiver), (2) acoustic signals reflected from an upper boundary (water surface), and (3) acoustic signals reflected from a lower boundary (bottom surface such as a sea floor).

Moreover, using the initial model, travel times of various ray types (direct ray, reflected ray from water surface, and reflected ray from bottom surface) for different source-receiver combinations are computed (at 406). An objective function is then minimized to solve for the vector $\delta m$. As noted above, the vector $\delta m$ contains $\delta s$ (change in source position), $\delta r$ (change in receiver position), and $\delta c$ (change in velocity).

The vector $\delta m$ is then used to update (at 410) the model. The updated model can then be used to predict positions of components of survey equipment, such as positions of acoustic receivers. The predicted positions can be relative positions (e.g., positions or receivers relative to each other or other components), or absolute positions (which can be calculated from known reference positions of one or more components of the survey equipment that have GPS receivers).

Using the techniques according to some embodiments, locations of an acoustic receiver network of a seismic spread, for example, can be determined, using direct arrivals of acoustic signals as well as reflected arrivals of acoustic signals from an upper boundary and a lower boundary. The techniques according to some embodiments can also correct for velocity variations in the body of water. In addition to using travel times, amplitudes and whole waveforms can also be used. Moreover, error estimates of the locations can be determined, using error estimates from the acoustic receiver network, and from GPS receivers located at various locations in the seismic spread.

Figure 5:
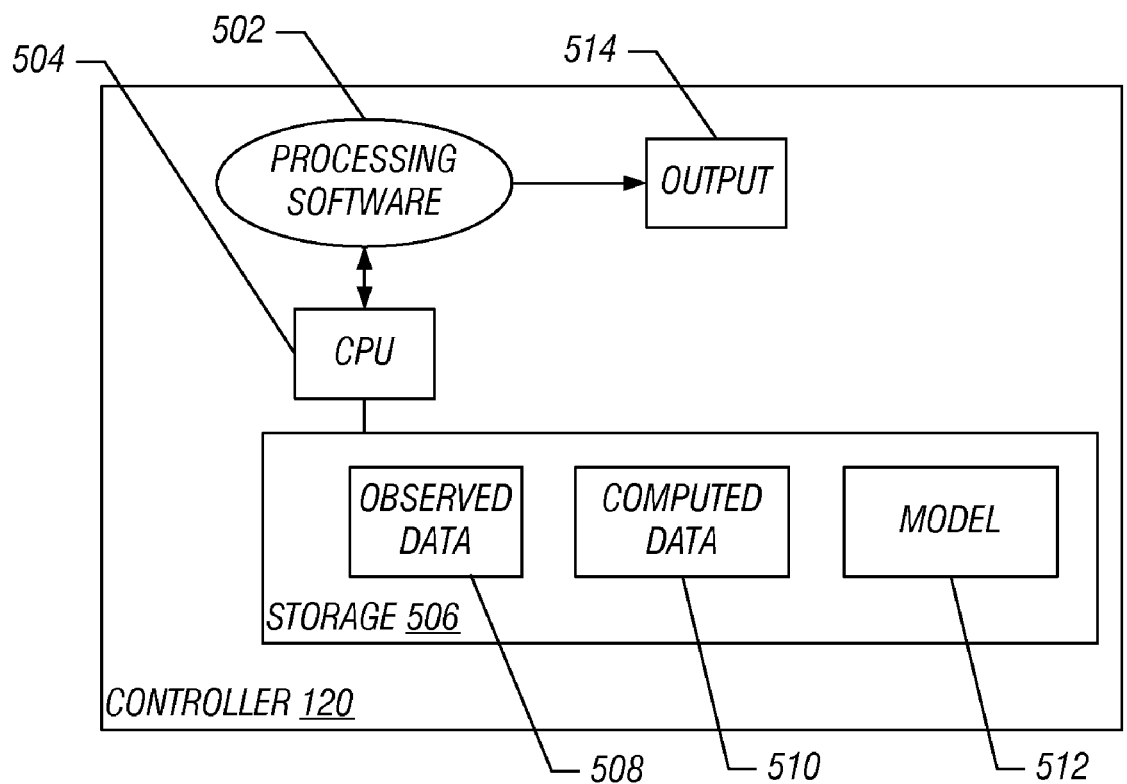
FIG. 5 is a block diagram of a computer that includes processing software to perform tasks according to an embodiment.

FIG. 5 shows components of the controller 120, which includes processing software 502 to perform the various tasks discussed above. The processing software 502 is executable on one or more central processing units (CPUs) 504, which is (are) connected to a storage 506. The storage 506 can store observed data 508 (e.g., observed travel times of acoustic signals), computed data 510 (e.g., computed travel times of acoustic signals), and models 512 (e.g., initial model and/or one or more updated models).

The processing software 502 is able to provide an output 514 based on the processing discussed above, where the output 514 can be presented for display in a display device, or can be communicated over a data network to a remote terminal.

Instructions of the processing software 502 can be loaded for execution on a processor (such as one or more CPUs 504). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method executed by a computer, comprising:
receiving measurements by an acoustic receiver of acoustic signals reflected from at least one boundary of a marine environment, wherein the reflected acoustic signals are reflected from the at least one boundary in response to acoustic signaling originated by an acoustic source; and
updating a positioning model based on the measurements of the acoustic signals, wherein the positioning model contains information relating to positions of components of a positioning system that includes the acoustic source and acoustic receiver.

2. The method of claim 1, wherein receiving the measurements comprises receiving the measurements of acoustic signals reflected from plural boundaries of the marine environment, and wherein updating the positioning model is based on the measurements of the acoustic signals reflected from the plural boundaries.

3. The method of claim 2, wherein receiving the measurements of the acoustic signals reflected from the plural boundaries comprises receiving the measurements of the acoustic signals from an upper boundary and a lower boundary.

4. The method of claim 3, wherein the upper boundary is a water surface, and the lower boundary is a bottom surface.

5. The method of claim 1, further comprising:
receiving measurement by the acoustic receiver of a direct acoustic signal from the acoustic source,
wherein updating the positioning model is further based on the measurement of the direct acoustic signal.

6. The method of claim 1, wherein updating the positioning model comprises updating the positioning model that further contains a velocity profile that specifies velocities of acoustic signaling in a body of water.

7. The method of claim 1, further comprising using the updated positioning model to estimate positions of components of survey equipment that is used to perform a survey operation.

8. The method of claim 1, further comprising:
computing data relating to ray paths from the acoustic source to the acoustic receiver that include a direct ray path from the acoustic source to acoustic receiver, reflected ray paths from an upper surface, and reflected ray paths from a lower surface.

9. The method of claim 8, further comprising defining an objective function based on the observed data and the computed data, and solving for changes to the positioning model according to the objective function.

10. The method of claim 9, further comprising minimizing the objective function to solve for the changes to the positioning model.

11. The method of claim 8, wherein updating the positioning model is further based on the computed data.

12. The method of claim 11, wherein the computed data relates to plural reflected ray paths reflected a plurality of times between boundaries.

13. An article comprising at least one computer-readable storage medium containing instructions that when executed cause a computer to:
compute an initial model that includes positions of acoustic sources and acoustic receivers and a velocity profile, wherein the acoustic sources and acoustic receivers are part of a positioning system to enable determination of positioning of survey equipment;
receive observed data relating to acoustic signals from acoustic sources reflected from a lower boundary and an upper boundary; and
according to the observed data, update the model.

14. The article of claim 13, wherein the instructions when executed cause the computer to further use the updated model to estimate positions of components of survey equipment.

15. The article of claim 13, wherein the instructions when executed cause the computer to further:
compute data relating to ray paths from acoustic sources to acoustic receivers that include direct ray paths from acoustic sources to acoustic receivers, reflected ray paths from the upper boundary, and reflected ray paths from the lower boundary.

16. The article of claim 15, wherein the instructions when executed cause the computer to further define an objective function based on the observed data and the computed data, and solving for changes to the model according to the objective function 17. The article of claim 13, wherein the upper boundary is a water surface, and the lower boundary is a sea floor.

18. A system comprising:
an acoustic positioning system to enable positioning of survey equipment, wherein the acoustic positioning system includes at least one acoustic source and a plurality of acoustic receivers; and a controller to:
  receive observed data relating to acoustic signals received by the acoustic receivers in response to an emitted signal from the acoustic source, wherein the acoustic signals received by the acoustic receivers include signals reflected from at least one of a water surface and a bottom surface;
  compute changes to a model according to the acoustic signals; and
  use the model to determine positioning of the survey equipment.

19. The system of claim 18, wherein the controller is configured to further:
  compute data relating to reflected ray paths from at least one of the water surface and the bottom surface, wherein computing the changes to the model is further according to the computed data.

20. The system of claim 19, wherein the controller is configured to further compute travel times based on the observed data, wherein the computed data comprises travel times.

21. The system of claim 18, wherein the positioning of the survey equipment comprises positioning of seismic receivers or electromagnetic receivers that are part of the survey equipment.

22. The system of claim 18, wherein the model contains information relating to positions of the acoustic source and the acoustic receivers, and a velocity profile.

* * * * *